UNITED STATES PATENT OFFICE.

JOHN C. KESSLER, OF MILWAUKEE, WISCONSIN, ASSIGNOR OF ONE-HALF TO CHRISTIAN WAHL, OF SAME PLACE.

PROCESS OF EXTRACTING METALLIC OR NATIVE COPPER FROM ORES OR TAILINGS.

SPECIFICATION forming part of Letters Patent No. 677,089, dated June 25, 1901.

Application filed November 5, 1900. Serial No. 35,554. (No specimens.)

*To all whom it may concern:*

Be it known that I, JOHN C. KESSLER, a citizen of the United States, residing at Milwaukee, county of Milwaukee, and State of Wisconsin, have invented new and useful Improvements in Processes of Extracting Metallic or Native Copper from Ores or Tailings, of which the following is a specification.

The object of my invention is to extract the copper contained in tailings or in ores containing metallic copper by the application of a solution of oxid of copper in ammonia, to which may be added salts of ammonia, such as sulfate of ammonia or nitrate of ammonia or chlorid of ammonia, in order to increase the efficiency of the solution. However, without such addition my solution can always be effectively used.

The liquid solution used in my process will not be affected, neutralized, or rendered inoperative by any foreign substances or impurities contained in the copper ores or tailings, but will remain active throughout the operation, completely and quickly dissolving the metallic copper and the copper only, and since my solution, having precipitated by electrolysis a portion of the copper contained in it, can be used over and over again with only a slight mechanical loss it is necessarily an economical one. Such a solution dissolves once again the amount of copper originally contained therein. The chemical reaction is very simple, according to the following formulæ:

1. $CuO.2NH_3 + Cu = Cu_2O.2NH_3$.
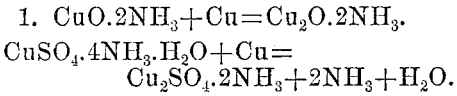

My experiments have shown that all the copper in ores or tailings was extracted, leaving only traces of this metal in the residue or waste.

My solution is obtained in the following manner: First, by dissolving hydrated oxid of copper in ammonia; second, by dissolving carbonate of copper in ammonia; third, by dissolving sulfate of copper in ammonia; fourth, by dissolving chlorid of copper in ammonia, and, fifth, by dissolving in ammonia any copper salt containing the copper in the form of oxid.

The application to the ores or tailings of my solution (which may be obtained in any of the above-named manners) is as follows: Having placed the tailings or the pulverized ores into the leaching-tanks, a sufficient quantity of solution is run on them to cover them completely. After twenty-four to forty-eight hours, depending upon the size of the particles, all of the copper will be in solution. In order to avoid the loss of ammonia by evaporation during the time of lixiviation, I preferably cover the solution with four or five inches of water, which being specifically lighter will stand above such solution. This sheet of water forms an air-tight seal, the diffusion of the two liquids being so slight that after two or three days the upper sheet of water will neither be colored nor smell of ammonia. After the ores or tailings have been sufficiently acted upon by the solution a portion only of the same is drawn off from the bottom of the tank sufficient to expose the surface of such tailings or ores, which emerge from the liquid on top, the remaining liquid being left in the tank, to which a new quantity of water is added on top. The withdrawing of the solution from the bottom is then resumed and fresh water added on top and this operation repeated until about the same quantity of copper solution has been withdrawn from the tank that was originally used for the treatment of the ores. The solution thus drawn off is a concentrated one and contains almost all of the copper, not only that part contained in the ores or tailings, but also the amount constituting part of the original solution. The further treatment of the concentrated copper solution is carried on separately from that of the weaker liquid, which on account of its being repeatedly used for washing the ores naturally becomes less effective. The concentrated copper solution having been removed the ores or tailings are repeatedly washed in the aforesaid manner until the discharged liquid runs off perfectly clear and without a tinge of blue color. When that stage of the process is reached, the metallic copper has been completely extracted. Two solutions are the result of these operations: (*a*) a concentrated one and (*b*) a weaker one. I then proceed as follows: Only about one-half of the copper contents of the concentrated solution is precipitated by electrolysis, it being absolutely necessary that a sufficient quantity of oxid of copper be left in the solution for the lixiviation of fresh quantities of ores or tailings. The formula of the original copper compound in solution, as above described, is as follows:

$$CuSO_4.4NH_3.H_2O.$$

By the addition of the copper leached out of the ores the formula of the new copper compound formed is:

$$Cu_2SO_4.2NH_3.$$

These formulæ are analogous to those given by Muspratt. (Latest edition.) The solution now contains about twice the original quantity of copper, and when about fifty per cent. of its copper contents has been precipitated electrolytically, as stated, the remaining solution is identical with the original one as to its copper contents. This amounts to a practical regeneration of the original solution, as the following formula will demonstrate:

$$Cu_2SO_4.2NH_3 + 2NH_3 + H_2O = Cu + CuSO_4.4NH_3.H_2O.$$

The electric current thus applied has a double effect. It not only precipitates the metallic copper on the cathodes, but also oxidizes the suboxid of copper ($Cu_2O$) in the solution into oxid of copper (CuO) on the anodes, so that the solution after about half of its copper contents have been separated practically constitutes the original solution again.

The treatment by the electric current of the weaker solution is carried on separately, for the reason that all of the copper dissolved in it has to be precipitated, leaving a weak ammonia solution. The latter, according to the method employed in the generation of the original solution, also contains small quantities of either sulfate of ammonia, carbonate of ammonia, or chlorid of ammonia.

Instead of using water for the purpose of washing fresh quantities of ores or tailings the remaining weaker ammonia solution is applied for that purpose after the ores have been treated with a concentrated solution, as above described. In this way the quantity of ammonia in the solution is increased by repeated applications until it becomes excessive, when its evaporation by heating the solution in the ammonia-still is required. The small quantity of strong ammonia solution thus obtained is added to the original solution.

With ordinary care the foregoing-described methods will greatly limit the waste of ammonia, as well as copper.

I have so far only mentioned the treatment of ores or tailings in open leaching vessels. They may also be treated in closed stationary tanks or rotary barrels, in which case the efficiency may be increased by pressure, such as steam, air, or water.

Having thus described my invention, what I claim as new, and desire to secure by Letters Patent, is—

1. The process herein described, of extracting metallic or native copper from ores or tailings, consisting in the application thereto, for a suitable period of time, of a solution of any cupric compound in ammonia, substantially as specified.

2. The process herein described of extracting metallic or native copper from ores or tailings, consisting—first, in the application thereto, in an uncovered water-tight receptacle, of a solution obtained by dissolving oxid of copper in ammonia; second, in the application of water to the surface of such solution, thereby forming a seal for preventing loss from evaporation, substantially as and for the purpose specified.

3. The process herein described of extracting metallic or native copper from ores or tailings, consisting—first, in placing such ores or tailings in an uncovered water-tight receptacle; second, in the application thereto, for a suitable period of time, of a solution of any cupric compound in ammonia; third, in forming a liquid seal upon the surface of such solution; fourth, in drawing off and separating such concentrated copper solution from the remaining tailings; fifth, in precipitating, by electrolysis, about one-half of the copper contained in such concentrated copper solution; and sixth, in returning such regenerated solution back to said tank for repeated use upon other untreated ores or tailings, substantially as and for the purpose specified.

4. The process herein described for extracting metallic or native copper from ores or tailings, consisting—first, placing such ores or tailings in an uncovered water-tight receptacle; second, in the application thereto, for a suitable period of time, of a solution of any cupric compound in ammonia; third, in forming a liquid seal upon the surface of such solution; fourth, in drawing off and separating such concentrated copper solution from the remaining tailings; fifth, in precipitating, by electrolysis, about one-half of the copper contained in such concentrated copper solution; sixth, in returning such solution back to said tank for repeated use upon other untreated ores or tailings; seventh, in precipitating by electrolysis all the copper contained in the so-called weak solution; and eighth, in the application of the weak ammonia solution remaining, after the copper has been thus precipitated, (instead of fresh water as in the first instance) to the tailings or ores subsequently treated in the leaching-tank, all substantially as and for the purpose specified.

In testimony whereof I affix my signature in the presence of two witnesses.

JOHN C. KESSLER.

Witnesses:
JAS. B. ERWIN,
CLARA L. ROESCH.